Inventor
Herbert A. McAninch
By L. Donald Myers
Attorney

Dec. 5, 1939.  H. A. McANINCH  2,182,443
ROLLER CHAIN AND LINK FOR CONVEYERS
Filed Dec. 7, 1937  4 Sheets-Sheet 3

Inventor
Herbert A. McAninch
By L. Donald Myers
Attorney

Dec. 5, 1939.  H. A. McANINCH  2,182,443
ROLLER CHAIN AND LINK FOR CONVEYERS
Filed Dec. 7, 1937  4 Sheets-Sheet 4

Inventor
Herbert A. McAninch
By L. Donald Myers
Attorney

Patented Dec. 5, 1939

2,182,443

UNITED STATES PATENT OFFICE 2,182,443

ROLLER CHAIN AND LINK FOR CONVEYERS

Herbert A. McAninch, Indianapolis, Ind., assignor to Link-Belt Company, a corporation of Illinois Application December 7, 1937, Serial No. 178,621

7 Claims. (Cl. 74—250)

This invention relates to new and useful improvements in roller chain and link constructions for conveyer assemblies.

It has been determined that the strength of chain, as being manufactured today, is not equal to the strength of the minimum cross section of material involved in the individual link members, as evidenced by the fact that the ultimate breaking strength is considerably under the strength of the minimum cross section. This clearly indicates that such chains are capable of being materially improved, for, failing to take full advantage of available material strength, they can hardly possess the best strength-weight ratio obtainable. As the demand for chains capable of operating at higher speeds is growing steadily, improvement in the strength-weight ratio becomes of great importance for excessive weight has a very destructive effect in the matter of impact loads and centrifugal tension.

In an effort to effect improvements in such chains, experiments and tests have been conducted to ascertain the proper distribution of material being used to bring about the greatest strength for a link and/or chain from the standpoint of impact, fatigue and ultimate strength and to obtain the most favorable strength-weight ratio and as close a balance of stresses as is possible in keeping with the proper distribution of materials. These experiments involved, among other things, a determination of the points of most frequent failures of chains and chain links and a study of stresses affecting the various elements comprising an individual link while being subjected to load conditions.

Such experiments developed several very interesting, enlightening and unpredictable facts, some of which were:

(1) In roller chains made up of conventional links having straight or flat side plates, wherein the sections of material carrying the load are equal in each link, the strength of the inside link members is greater than the strength of the outside members.

(2) In roller chains employing offset links, either throughout the entire assembly or as couplers when an odd number of pitches in the total chain length is desired, the narrower ends of the links; i. e., the ends of the links which are positioned between the side plates of the next adjacent links, are stronger than the wider ends.

(3) Links having side plates formed with straight longitudinal edges are stronger than links having curved longitudinal edges, such as those found in "dumb-bell" links.

(4) The removal of material from the center of a side plate, preferably over an area extending transversely of the plate to an extent substantially equal to the diameter of the pitch holes, not only effects a reduction in the weight of the plate but it increases its strength with said increases being in direct proportion to the increase in material removed up to the point where no material remains between the two pitch holes.

In an effort to ascertain reasons for the facts recited in the above paragraphs identified as 1 and 2, inside and outside links and the opposite end portions of offset links were carefully compared. What appeared to be the most outstanding difference between these compared parts was the diameters of the pitch holes. In roller chains, the inside links and the narrower ends of offset links have comparatively large pitch holes for mounting bushings while the outside links and the wider ends of offset links have smaller pitch holes to mount the chain pins which pass through and are journaled in the bores of said bushings. If this difference was responsible for the differences in strength, the ratios of the pitch hole diameter to the dimensions of the material around the pitch holes must be factors which govern the strength of chain links and the provision of a greater amount of material around a pitch hole, although contrary to what might be expected, would not provide greater strength. Experiments were conducted with this feature in mind and it was determined that there exists a combination of proportions which would give, when used as a group, a strength value in the critical stress sections consistent with the strength of the material used and a balance between the strengths of inside and outside links and the opposite ends of individual offset links. It was found that any departure from this combination of proportions, involving any one or more of the elements of the combination, would result in an appreciable lowering of the strength value of the affected links and, naturally, a chain embodying said links. This combination of proportions deals primarily with dimensions in the plane of the face of a side plate. Variations in loads can be taken care of by varying the thickness of the side plates to provide the necessary amount of material in the load carrying sections to sustain the load. The use of this combination of proportions was found to effect marked improvements in the strength-weight ratio.

Explanations for the facts recited in the above set forth paragraphs bearing numbers 3 and 4 were obtained by studying the stress flow line patterns produced by the differently constructed chain link side plates when subjected to load conditions.

It was determined that in straight edged side plates, the stress or force flow lines extended the full length of the plates without interruption and with substantially no deflection of such lines in the regions of the longitudinal edges of the plates, whereas in curved edged side plates, many of the stress or force flow lines did not extend the full length of the plates and a marked deflection was present in all lines which did extend the full length.

The explanation for the increase in the strength or stress value resulting from the removal of material from the centers of the links was found to be due to the reduction or elimination of concentration of stress or force flow lines on the opposite transverse sides of the pitch holes and to reducing or entirely eliminating stress or force flow lines which extended longitudinally of the centers of the plates and were deflected around the opposite transverse sides of the pitch holes. Naturally, this elimination of material from the centers of the side plates effected a material improvement in the strength-weight ratio.

In keeping with the above discoveries, the primary objects of this invention are to provide roller chains and links in which proper proportions or combinations of dimensions and a proper distribution of material are employed to produce maximum strength characteristics with minimum weight; a minimum of stress and as close a balance of stresses as is possible; the greatest strength from the standpoint of impact, fatigue and ultimate strength; a strength value in the critical stress sections consistent with the character and amount of material used, and a balance of strength between the different links of a chain assembly and the different portions of individual links when the areas of stress in all of the links are maintained equal.

Other objects and advantages of the invention will be apparent during the course of the following description.

In the accompanying drawings forming a part of this specification and in which like numerals are employed to designate like parts throughout the same.

Figure 11a is an edge plan view of the link side plate disclosed in Fig. 11, Figure 11b is a transverse sectional view taken on line 11b—11b of Fig. 11a, Figure 11c is a transverse sectional view taken on line 11c—11c of Fig. 11a.

Figure 12 is a side elevational view of a modified form of chain link side plate of the type disclosed in Fig. 11.

The advancements made in the art by this invention deal with improvements in the ultimate strength, the strength-weight ratio, and the stress conditions obtained. The desired results have been accomplished by modifications embodied in chain link side plates. Such improved chain link side plates, when incorporated in a complete chain assembly, naturally, effect the same type of improvements in the total chain length. Figs. 5 to 12a have been presented to show the developments of the improvements embodying this invention in the side plates of flat links and offset links. These figures, therefore, first will be referred to.

Figures 5, 7, 10A:
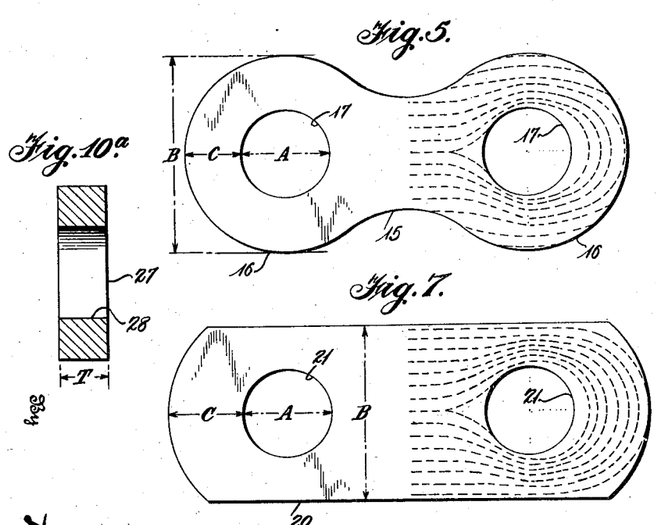
Figure 5 is a side elevational view of a chain link side plate of the type now conventionally employed, said side plate being of the straight link type.
Figure 7 is a side elevational view of a chain link side plate which incorporates in its construction improved features in addition to those disclosed in the side plate illustrated in Fig. 6.
Figure 10a is a transverse sectional view taken on line 10a—10a of Fig. 10.

The development of the invention in link side plates of the straight link type is fully illustrated in Figs. 5 to 10a, inclusive. Fig. 5 discloses a single side plate of a link of the type conventionally referred to as a "dumb-bell" link. This type of link is standard construction for probably all manufacturers of roller chains. The link side plates include the relatively narrow central portion 15 with the two enlarged ends 16. Each end 16 is provided with a pitch hole 17. Chains made up of links employing this type of straight side plates are composed of pivotally connected, alternately arranged inside and outside links. The pitch holes 17 for the inside links are formed of a proper diameter to mount bushings or tubular sleeves. The two side plates and the two bushings or sleeves which form an inside link are connected by a press fit to prevent relative movement between the side plates and the bushings. The pitch holes 17 for the outside links are provided to mount chain pins which are of a proper diameter to be journaled within the bores of the bushings of the inside links. The pitch holes 17 for the outside links, therefore, are considerably smaller than the pitch holes for the inside links. The inside and outside links of a chain of this type are provided with side plates wherein the sections of material carrying the load are equal in each side plate and complete link. The inside links, however, are provided with pitch holes of greater diameter than the pitch holes of the outside links.

As has been pointed out above, it was determined that a chain formed of links including side plates of the type disclosed in Fig. 5 does not have the strength of the minimum cross section of material involved in the individual link members. It was also determined that inside links formed with pitch holes of large diameters to receive the bushings possessed greater strength than did the outside links which have the smaller diametered pitch holes. As a result of determining that chains of this "dumb-bell" link type do not take full advantage of available material strength and that an unbalanced strength condition existed between inside and outside links, experiments were conducted with links having side plates of many different shapes and combinations of proportions.

As a result of these experiments, it was determined that a link possessing straight longitudinal edges on its side plates was stronger than a link formed of side plates having curved longitudinal edges, such as the "dumb-bell" link of Fig. 5. It, also, was determined that the inside links are stronger than the outside links because the inside links are formed with side plates possessing a more favorable combination of proportions in the regions of the pitch holes or critical stress sections. The combination of proportions found to be most desirable deals with ratios of dimensions in the plane of the face of a side plate. Ascertaining the difference in strength between inside and outside links led to the discovery that the diameter of a pitch hole formed the basis for all of the remaining dimensions involving the material surrounding a pitch hole. For the purpose of comparing relative strengths of link side plates of different shapes and dimensional combinations, formulas were established as follows:

Let
   A equal the diameter of the pitch hole,
   B equal the width of the side plate,
   C equal the distance from the outer edge of the pitch hole to the end of the side plate on the center line,
   T equal the thickness of side plate,
   $R_W$ equal the ratio of the width of the side plate to the diameter of the pitch hole,
   $R_L$ equal the ratio of the distance between the pitch hole and the end of the side plate to the width of the side plate minus the pitch hole diameter, and
   K equal the stress ratio.

The above ratios are computed as follows:

$$R_W = \frac{A}{B}$$

$$R_L = \frac{C}{B-A}$$

$$K = \frac{\text{Maximum stress across critical section}}{\text{Average stress on an area BT}}$$

In Fig. 5, the formula characters A, B and C have been applied to the left-hand end of the link side plate disclosed. It will be appreciated that roller chains produced by the various manufacturers are standardized so that the chains of different manufacturers may be interchangeably used on standard sprockets of given pitches and numbers of teeth. This standardization necessitates the use of rollers, bushings and chain pins of substantially uniform dimensions in the chains of the different manufacturers. The pitch hole diameters, therefore, are substantially identical in all of the chains of a given link size which are manufactured by the different roller chain producers.

Chain link side plates of the type shown in Fig. 5 were measured insofar as the dimensions A, B and C are concerned, for a large number of different sized links and for a great many of the chains manufactured by different producers. It was found that the following values prevailed:

$R_W = .333$ outside link
   $.572$ inside link
$R_L = .5$
$K = 2.64$ (average)

As the inside links had been found to be stronger than the outside links, it was assumed that the $R_W$ ratio for the conventional inside links was closer to the proper ratio than that for the outside links. The experimental link disclosed in Fig. 6 then was produced and tested.

It will be noted that this link is provided with straight longitudinal edges 18 and with pitch holes 19. The straight longitudinal edges 18 for this plate are equal in length to the pitch of these links. The $R_W$ ratio of this link side plate was changed to .5. The $R_L$ ratio was kept the same as that for the side plate of Fig. 5. This link side plate was found to possess the following stress ratio: $K = 2.53$. It will be appreciated that the lower stress ratio K a link side plate possesses, the stronger the side plate. This side plate of Fig. 6, therefore, proved to be stronger than the side plate shown in Fig. 5.

Figure 6:
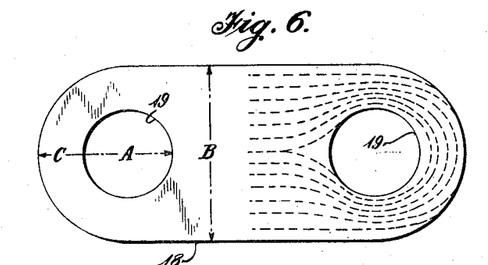
Figure 6 is a side elevational view of a chain link side plate which partially embodies the improved features of construction ultimately resulting from the development of this invention.

The right-hand portions of the side plates shown in Figs. 5 and 6 have been provided with dash lines which are intended to represent the stress flow line patterns produced in these side plates when subjected to load conditions. It is believed that these stress flow line patterns provide an excellent explanation why a chain link side plate having straight longitudinal edges is stronger than one having curved longitudinal edges. In Fig. 5, it will be seen that several of the stress flow lines occurring in the outer regions of the enlarged end portion 16 do not extend the entire length of the link side plate. All of the stress flow lines in the link side plate disclosed in Fig. 6 are permitted to extend longitudinally of the side plate without interruption through the center of the plate because of the elimination of the reduced central portion 15 of the side plate shown in Fig. 5.

Fig. 7 illustrates a further modified form of link side plate. This link side plate is provided with straight longitudinal edges 20 which are of greater length than the pitch of the said plate; i. e., the straight longitudinal edges 20 extend well beyond the pitch holes 21. This link side plate was further modified by increasing the C dimension. This link of Fig. 7 possessed the following values:

$R_W = .5$
$R_L = .85$
$K = 2.31$

By considering these values, it will be seen that the stress ratio was improved appreciably by changing the $R_L$ ratio from .5 to .85.

By comparing the stress flow line patterns of the side plates shown in Figs. 6 and 7, it will be seen that the lengthening of the dimension C permits all of the flow lines to continue uninterruptedly around the outer side of the pitch hole.

Experiments also were conducted in an endeavor to improve the strength-weight ratio by removing material from the center of the side plate. This modification was found to not only reduce the weight of a side plate, but it materially improved the stress ratio. It was ascertained that the stress ratio became lower each time more material was removed from the center of the side plate. This improvement continued until all of the material was removed from between the two pitch holes.

Figure 8:
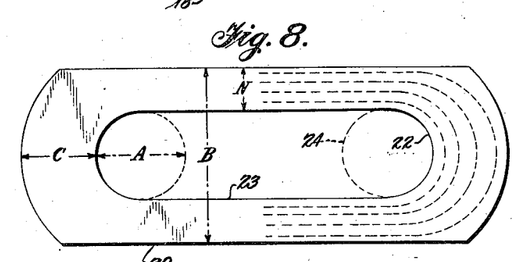
Figure 8 is a side elevational view of a chain link side plate which further illustrates the advancement made by this invention.

Fig. 8 illustrates a link side plate with all the material removed from between the pitch holes. This link side plate possessed the same A, B and C measurements as the link side plate shown in Fig. 7. The $R_W$ and the $R_L$ values or ratios for the side plate of Fig. 8, therefore, are the same as for the side plate shown in Fig. 7. It was found, however, that the side plate of Fig. 8 possessed a K (stress ratio) of 1.97 which constituted a marked improvement over the K value of the side plate disclosed in Fig. 7.

It is believed that the improvement in the stress ratio resulting from the removal of material from the center of a link side plate is indicated by the difference in the stress flow line patterns for the side plates of Figs. 7 and 8. By considering the disclosure of Fig. 7, it will be seen that the flow lines which extend through the transverse central region of the side plate continue around the opposite sides of the pitch hole and result in a concentration of flow lines on the opposite transverse sides of the pitch hole. In Fig. 8, this concentration of stress flow lines on the opposite sides of the pitch hole 22 is eliminated. All of the stress flow lines extend continuously the full length of the side plate and around the outer sides of the pitch holes. None of the stress flow lines, furthermore, are deflected in flowing from the central portion of the link side plate past the pitch holes.

The removal of the material from the central portion of a side plate brings into consideration a new dimension; i. e., the width of each longitudinally extending band of material positioned between the pitch holes and designated by the reference character 23. This dimension has been given the character N. The formula for arriving at this dimension N is as follows:

$$N = \frac{B}{2K}$$

The link side plate of Fig. 8, it will be noted, employs the straight longitudinal edges 20 of the form of side plate shown in Fig. 7. The dash lines 24 are provided merely for the purpose of completing the circle of each pitch hole 22 and are not intended to indicate the presence of any material.

It will be apparent that a link side plate of the type shown in Fig. 8 cannot be used as a part of a chain link because no material is provided on the inner longitudinal sides of the pitch holes to support or mount the bushings and chain pins. Sufficient material to mount the bushings and chain pins must be provided.

Figure 9:
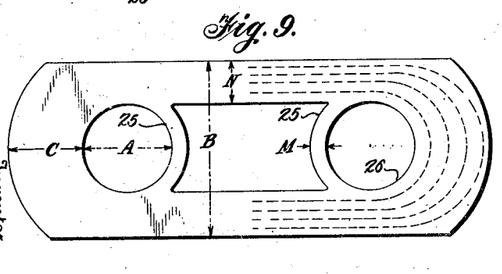
Figure 9 is a side elevational view of a chain link side plate which includes all of the features of construction produced by the development of this invention.

Fig. 9 discloses a band of material 25 for completing the pitch holes 26. The character M is employed to represent the width of this band. It has been determined that the M value must bear a certain ratio with respect to the thickness of the link side plate. It will be appreciated that a link side plate, to carry a particular load, must possess the necessary amount of material in the load carrying section. Link side plates having a given pitch hole diameter, therefore, may be provided to carry different loads by varying the thickness of the side plates.

It has been found that the strip or band of material 25 must be equal to the thickness of the link side plate if the side plate is to be punched or blanked from a strip or sheet of stock. This amount of material is necessary to provide proper support for the material surrounding the pitch holes being punched. If the material around the holes is too thin, it will actually roll or turn over and will not produce a good fit with the bushings or chain pins to be mounted therein. However, if the link side plates are produced in a machining operation, the pitch holes can be drilled or reamed when much less material is provided in the bands 25.

The bands 25 in Fig. 9 are representative of the minimum amount of material which can be provided on the inner sides of the pitch holes and yet properly sustain the bushings or chain pins mounted in said holes. In this chain link side plate, the M measurement is as follows:

M = .3T (T equals thickness of side plate)

The dimensions A, B and C for the link side plate of Fig. 9 are the same as those for the side plate shown in Figs. 7 and 8. This link side plate of Fig. 9 has the following values:

$$R_W = .5$$
$$R_L = .85$$
$$M = .3T$$
$$N = \frac{B}{2K}$$
$$K = 2.13$$

It will be seen that the addition of the band of material 25 has increased the stress ratio over that given above for the link side plate shown in Fig. 8. This stress ratio factor of 2.13 appears to be about the best that can be obtained for operative chain link side plate.

Figure 10:
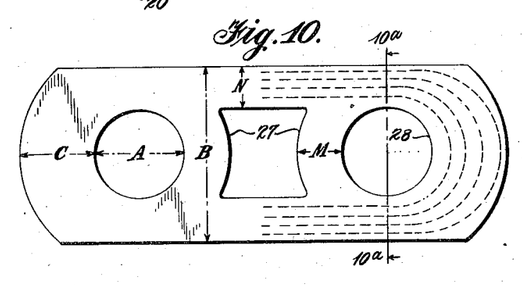
Figure 10 is a side elevational view of a chain link side plate embodying all of the features of the side plate illustrated in Fig. 9, but illustrates a slight modification of one element of the side plate.

Fig. 10, with the sectional view Fig. 10a, illustrates a chain link side plate of the design shown in Fig. 9 with bands 27 at the inner sides of the pitch holes 28. In this link side plate, the dimension M equals the dimension T. The values for this plate of Fig. 10 figure out as follows:

$$R_W = .5$$
$$R_L = .85$$
$$M = T$$
$$N = \frac{B}{2K}$$
$$K = 2.28$$

The stress ratio value is shown in this table as having been increased by the addition of more material in the band 27 provided for each pitch hole. As stated above, an increase in the K value represents a decrease in strength. The link side plate of Fig. 10, therefore, is not as strong as the link side plate of Fig. 9, but it is believed to be the strongest link side plate obtainable when the side plates are produced by a punching or blanking operation.

As has been stated above, the values given for the side plates disclosed in Figs. 9 and 10 represent the most favorable ratings obtainable by means of the two different methods of producing such side plates. It has been determined, however, that beneficial improvements can be obtained over the conventional link side plate shown in Fig. 5 if side plates are produced which fall within the following ranges of values:

$$A = .45B \text{ to } .6B$$
$$C = .6(B-A) \text{ to } .95(B-A)$$
$$M = .3T \text{ to } 1.5T$$
$$N = \frac{B}{K} \text{ to } \frac{B}{2K}$$

Figure 11:
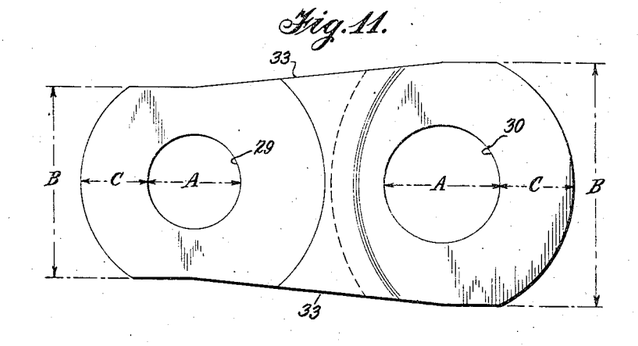
Figure 11 is a side elevational view of a side plate of the type employed in offset links.
Figures 11A, 11C, 12:
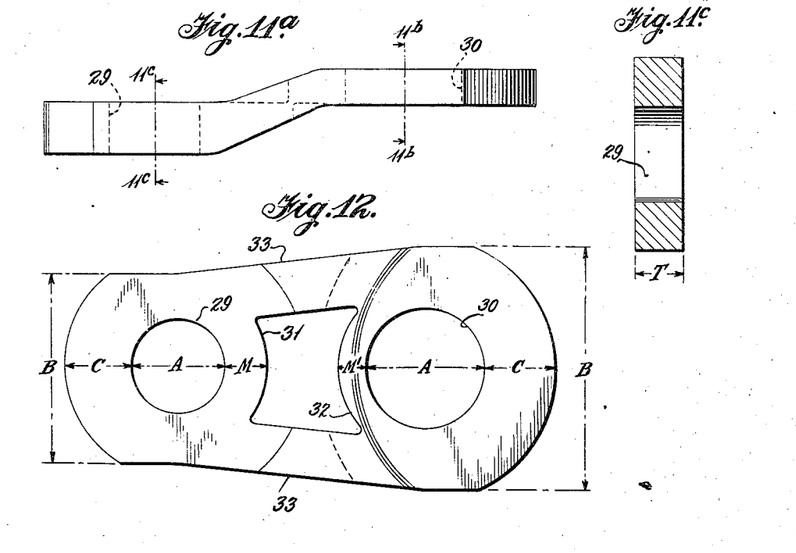
Figure 11B:
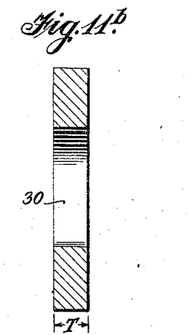
Figure 12A:
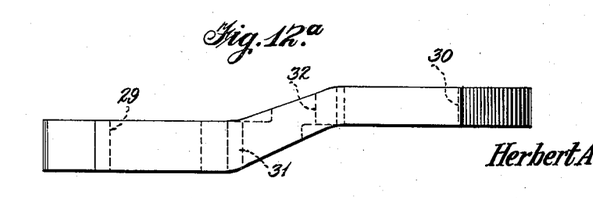
Figure 12a is an edge plan view of the chain link side plate disclosed in Fig. 12.

Figs. 11 to 12a disclose side plates for offset links. It will be appreciated that the side plates disclosed in Figs. 5 to 10a are representative of either inside or outside links. When the above noted combination of proportions is followed in producing a complete chain from inside and outside links, the inside links, naturally, will possess different dimensions for the characters A, B, C, M, N and T than the outside links. This difference in dimensions results from changing the dimension A to accommodate bushings which are mounted in the side plates of the inside links. The outside link side plates, of course, mount the smaller chain pins. The side plates of offset links are comparable for approximately one-half of their length with outside links while the remainder are comparable with inside links. The pitch hole 29 must possess a diameter which will mount a chain pin while the pitch hole 30 must possess a diameter which will mount a bushing.

Figs. 11 to 11c disclose an offset link constructed in accordance with the preferred combination of proportions set forth in connection with the side plate disclosed in Fig. 7. No material has been removed from the center of this side plate. Figs. 12 and 12a disclose an offset link side plate constructed with the combination of proportions set forth for the side plate disclosed in Figs. 10 and 10a. The values for M and N are the same for the side plate of Figs. 12 and 12a as have been given for these characters of the link disclosed in Figs. 10 and 10a. In carrying out the same combination of proportions for the opposite halves of an offset link side plate, the opposite ends of the link side plate naturally are of different widths. Both halves of such a side plate also should possess the same cross sectional area through the critical sections. Figs. 11b and 11c clearly illustrate the difference in dimension for the character T for these two sections. As the bands 31 and 32, of the side plate shown in Fig. 12, are formed of material of different thicknesses, the M values will be different. Although it is impossible to provide longitudinal edges in offset links which are straight in the same sense as are the longitudinal edges for the link side plates disclosed in Figs. 6 to 10, inclusive, the longitudinal edges 33 are disclosed in Figs. 11 and 12 as being maintained as near as possible in a single plane; i. e., a single plane for each longitudinal edge.

Let us now consider Figs. 1 to 4a, inclusive, which illustrate the adoption of the invention described in connection with Figs. 6 to 12a, inclusive, in conveyer chains of different types.

Figure 1:
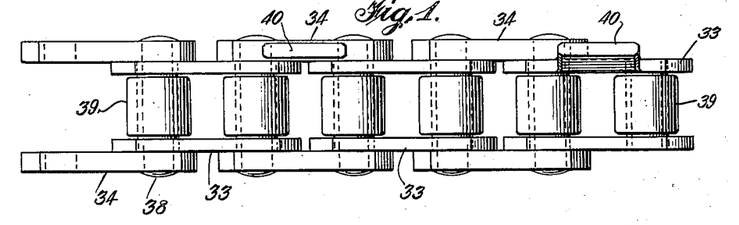
Figure 1 is a plan view of a type of conveyer chain embodying this invention.
Figure 1A:
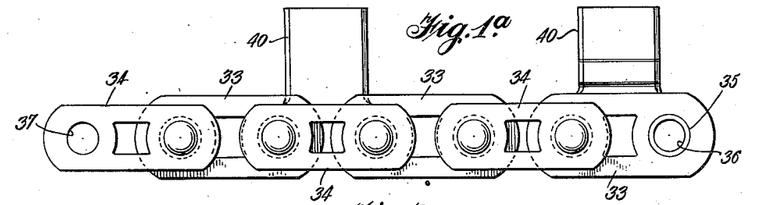
Figure 1a is a side elevational view of the section of chain illustrated in Fig. 1.

Referring first to Figs. 1 and 1a, we find disclosed a conveyer chain made up entirely of inside and outside links. The side plates for the inside links are designated by the reference character 33 while the side plates for the outside links are identified by the reference character 34. The inside links are provided with pitch holes 35, see the right-hand link of Fig. 1a, of a proper diameter to mount the bushings 36. The outside links 35 are provided with pitch holes 37 of a proper diameter to mount the chain pins 38. It will be seen that the chain pins not only pass through the pitch holes 37 of the outside links 34, but also pass through the bores of the bushings 36 to pivotally connect the inside and outside links. The bushings 36 not only perform their duty to pivotally connect the links, through the medium of the pins 38, but they act as bearings for the rollers 39. In applying the combination of proportions described in connection with either Fig. 9 or Fig. 10 to the inside and outside link side plates 33 and 34, the difference in the diameters of the pitch holes 35 and 37 results in the provision of inside link side plates 33 which are wider than the outside link side plates while the said outside link side plates 34 are thicker than the side plates 33. A chain constructed as shown in Figs. 1 and 2, which follows the desired combination of proportions previously referred to, possesses an absolute balance of strength between the inside and outside links.

At suitably spaced intervals throughout the entire length of a chain constructed of links of the type shown in Figs. 1 and 1a, conveying lugs 40 are formed as integral parts of the inside and outside plates 33 and 34. These lugs may function to push articles to be conveyed along a track or trough or the lugs may be suitably apertured or modified in construction to permit them to mount article conveying plates, buckets, or the like, not shown.

Figure 2:
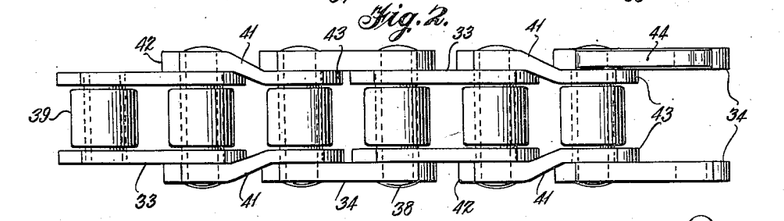
Figure 2 is a top plan view of a modified form of conveyer chain which embodies this invention.
Figure 2A:
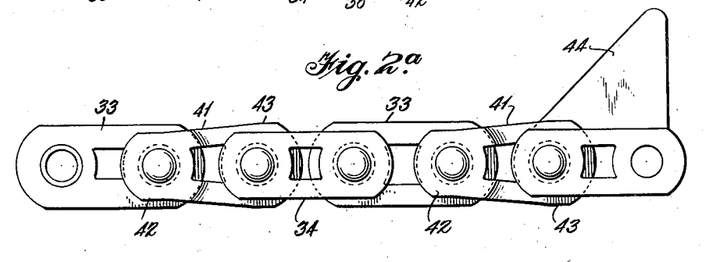
Figure 2a is a side elevational view of the section of chain disclosed in Fig. 2.
Figure 2B:
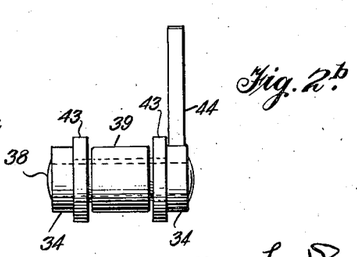
Figure 2b is an end elevational view of the section of chain disclosed in Figs. 2 and 2a, Figure 3 is a plan view of a section of a still further modified form of conveyer chain embodying this invention.

Figs. 2, 2a and 2b disclose a conveyer chain employing inside and outside links of the character shown in Figs. 1 and 1a. The disclosure of these latter figures, however, has been modified to illustrate the use of offset links in a conveyer chain constructed of inside and outside links. It will be appreciated that a chain which is composed of inside and outside links solely possesses an even number of pitches for it can only be modified with reference to its length by inserting or removing a pair of links composed of one inside and one outside link. When it is desirable to have a chain with an odd number of pitches, this can only be accomplished by inserting an offset link. For other reasons, it may be desirable to insert two or more offset links in a chain composed primarily of inside and outside links. Figs. 2 and 2a disclose a section of conveyer chain with two offset links incorporated therein. The inside and outside links are of the same construction as those disclosed in Figs. 1 and 1a and for that reason, the same reference characters will be applied to similar elements in Figs. 2 and 2a. The side plates 41 for the two offset links are each provided with an end portion 42 which compares in proportions with one end portion of an outside link 34. These side plates 41 also are each provided with an end portion 43 which compares in proportions with an end portion of an inside link 33. A chain constructed in this manner is found to possess a perfect balance of strength between the inside and the outside links, the said inside and outside links and the offset links, and the opposite end portions or critical stress sections of all of the links.

Although this conveyer chain construction of Figs. 2 and 2a may be provided with lugs of the character designated by the numeral 40 in Figs. 1 and 1a, a different type of conveying lug 44 is illustrated. This lug is normally employed to effect movement of objects along a supporting surface.

Figure 3:
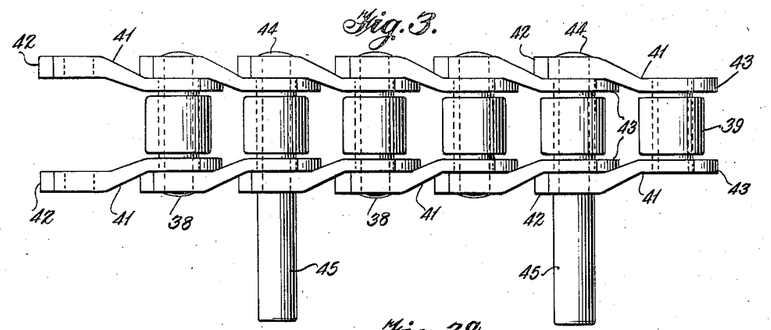
Figure 3A:
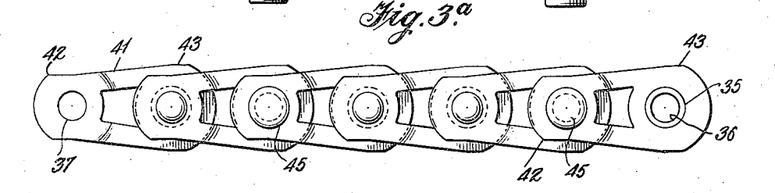
Figure 3a is a side elevational view of the section of chain disclosed in Fig. 3.

Figs. 3 and 3a disclose a section of a conveyer chain which is formed in its entirety of offset links 41. The narrower and thicker ends 42 of these links are provided with pitch holes 37 for mounting chain pins 38. The wider and thinner ends 43 are provided with pitch holes 35 of a proper diameter to mount the bushings 36. The ends 43 of the side plates 41 are positioned inside of the end portions 42 of the side plates for the adjacent links. This manner of assembling the various links is clearly illustrated in Figs. 3 and 3a. To effect conveying of articles, certain of the chain pins 44 are extended axially beyond one side of the chain and are enlarged to provide the projecting end portions 45.

Figure 4:
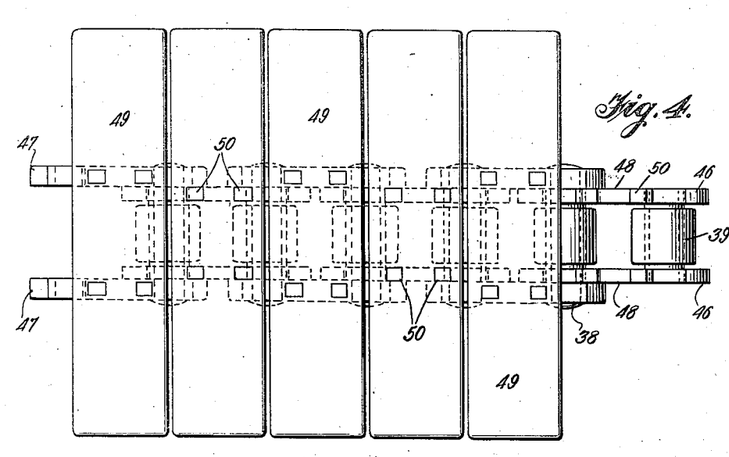
Figure 4 is a top plan view of another form of conveyer chain embodying this invention.
Figure 4A:
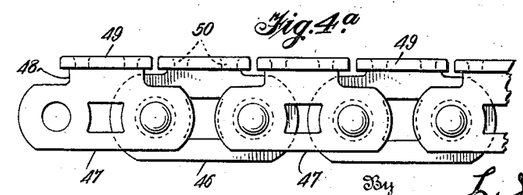
Figure 4a is a side elevational view of the section of chain illustrated in Fig. 4.

Figs. 4 and 4a disclose what is commonly called a flat top conveyer. This roller chain is made up of inside links 46 and outside links 47. Each one of the link side plates is provided with an upstanding flange 48 which functions to mount a top carrier plate 49. These carrier plates are secured to the flanges 48 by means of peened over lugs 50 which are carried by the flanges 48 and are received in apertures or openings formed in the top plate. Other than being provided with the flanges 48 and the top plate securing lugs 50, the side plates 46 and 47 for the inside and outside links correspond structurally with the plates 33 and 34 of the chains disclosed in Figs. 1 to 2b, inclusive.

Figure 13:
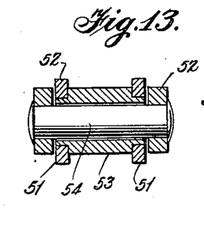
Figure 13 is a transverse sectional view of a modified form of chain pin and bushing assembly for chains.

The chain assemblies disclosed in Figs. 1 to 4a inclusive, are provided with rollers 39 rotatably mounted on bushings 36 which function to connect the side plate of inside links or the end portions of offset link side plates which are relatively positioned the same as inside links. These rollers naturally materially reduce sprocket wear. Less expensive chains are provided by most manufacturers which are interchangeable with the chains above referred to, but which do not have the separately rotatable rollers. In these chains, the bushings are enlarged at their central portions to the diameter of the rollers and the bushings then also function to a limited extent as rollers. Fig. 13 illustrates this modified type of combined bushing and roller.

It is to be understood that the side plates 51 and 52 are intended to represent either the side plates of inside and outside links or the side plates of offset links. A combined bushing and roller 53 is properly connected at its ends to the side plates 51. The remaining side plates 52 are rigidly connected together and are pivotally connected to the side plates 51 by the chain pin 54 which passes through the bore of the element 53. The chain pin 54 and combined bushing and roller 52 may be substituted for the bushings 36, pins 38 and rollers 39 in any or all of the chain assemblies of Figs. 1 to 4a without in any way affecting the advantages provided by the side plate designs shown therein.

It is believed that the foregoing description, when considered with the drawings, will furnish one skilled in the art with a clear understanding of the improved construction of the use of the disclosed chain link side plate proportions and structural changes. It might be stated at this time that ultimate strength tests have been made to compare the links disclosed in Figs. 9, 10, 11 and 12 with chain link side plates of conventional design produced by many manufacturers. It has been found that the links embodying this invention effect an increase in strength over conventional links of approximately 19 per cent per inch of pitch over the best conventional chain and yet the strength per pound of weight is equivalent. Chains formed of the improved links embodying this invention are completely interchangeable with conventional chains designed for the same type of use and present no greater manufacturing problem.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:

1. A chain length of the type described comprising a plurality of pivotally connected links, each of said links including a pair of side plates formed with a pitch hole in each end portion of the same, the pivotal connections between adjacent links each including a pair of inside side plate end portions connected by a bushing received in their pitch holes and a pair of outside side plate end portions connected by a chain pin received in their pitch holes and which pin also passes through the bore of the bushing of adjacent inside side plate end portions, the inside side plate end portions each being of greater width and less thickness on the transverse section passing through the pitch hole axis than each of the outside side plate end portions on a similar section, each pitch hole of all of said side plate end portions having a diameter which is from .45 to .6 of the width of the side plate on its aforesaid transverse section and being spaced from its adjacent end of the side plate a distance along the longitudinal center line of the side plate which is from .6 to .95 of the difference between the aforesaid width of the side plate and the diameter of the pitch hole.

2. A chain length of the type described comprising a plurality of pivotally connected links, each of said links including a pair of side plates formed with a pitch hole in each end portion of the same, the pivotal connections between adjacent links each including a pair of inside side plate end portions connected by a bushing received in their pitch holes and a pair of outside side plate end portions connected by a chain pin received in their pitch holes and which pin also passes through the bore of the bushing of adjacent inside side plate end portions, the inside side plate end portions each being of greater width and less thickness on the transverse section passing through the pitch hole axis than each of the outside side plate end portions on a similar section, each pitch hole of all of said side plate end portions having a diameter which is from .45 to .6 of the width of the side plate on its aforesaid transverse section and being spaced from its adjacent end of the side plate a distance along the longitudinal center line of the side plate which is from .6 to .95 of the difference between the aforesaid width of the side plate and the diameter of the pitch hole, all of said side plates having the same area on the aforesaid transverse sections which pass through the pitch hole axes.

3. A chain length of the type described comprising a plurality of pivotally connected links, each of said links including a pair of side plates formed with a pitch hole in each end portion of the same, the pivotal connections between adjacent links each including a pair of inside side plate end portions connected by a bushing received in their pitch holes and a pair of outside side plate end portions connected by a chain pin received in their pitch holes and which pin also passes through the bore of the bushing of adjacent inside side plate end portions, the inside side plate end portions each being of greater width and less thickness on the transverse section passing through the pitch hole axis than each of the outside side plate end portions on a similar section, each pitch hole of all of said side plate end portions having a diameter which is from .45 to .6 of the width of the side plate on its aforesaid transverse section and being spaced from its adjacent end of the side plate a distance along the longitudinal center line of the side plate which is from .6 to .95 of the difference between the aforesaid width of the side plate and the diameter of the pitch hole, each of said link side plates having an opening formed in its central region which has a width adjacent each pitch hole that is substantially the same as the diameter of the pitch hole and a length which will leave a band of material on the inner side of each pitch hole having a minimum width ranging from .3 to 1.5 of the thickness of the side plate through said band.

4. In a chain of the type described, a plurality of link side plates each comprising an elongated body portion having a pitch hole formed in each end portion and straight longitudinal edges which extend in both directions beyond the pitch holes, the diameter of each pitch hole being from .45 to .6 of the width of the side plate on the transverse section which passes through the pitch hole axis and being spaced from its adjacent end of the side plate a distance along the longitudinal center line of the side plate which is from .6 to .95 of the difference between the aforesaid width of the side plate and the diameter of the pitch hole whereby when said pitch holes are of a relative size to receive a link joint forming bushing the side plate will be wider and longer than when the said pitch holes are of a size to receive a link joint forming chain pin, said body portion having an opening formed in its central region which has a width that is substantially the same as the diameter of the pitch hole and is of proper length to leave a band of material on the inner side of each pitch hole having a width ranging from .3 to 1.5 of the thickness of the side plate through said band.

5. A chain length of the type described comprising a plurality of pivotally connected alternating inside and outside links, each of said links including a pair of side plates formed with a pitch hole in each end portion of each of the same, the inside link side plates being connected together by bushings received in their pitch holes, the outside link side plates being connected together by chain pins received in their pitch holes and which pins also pass through the bushings at the ends of the adjacent inside links, the inside link side plates being of greater width and less thickness on the transverse sections passing through their pitch hole axes than the outside link side plates on similar sections, each pitch hole of all of said side plates having a diameter which is from .45 to .6 of the width of the side plate on its aforesaid transverse section and being spaced from its adjacent end of the side plate a distance along the longitudinal center line of the side plate which is from .6 to .95 of the difference between the aforesaid width of the side plate and the diameter of the pitch hole.

6. A chain length of the type described comprising a plurality of pivotally connected offset links, each of said links including a pair of side plates formed with a pitch hole in each end portion of each of the same, the pitch holes at one end of the link mounting a bushing and the pitch holes at the other end mounting a chain pin to be journaled in the bushings of an adjacent link, the end portions of the side plates which mount the bushings being of greater width and less thickness on the transverse sections passing through their pitch hole axes than the chain pin mounting end portions on similar sections, each pitch hole of all of said side plate end portions having a diameter which is from .45 to .6 of the width of the side plate on its aforesaid transverse section and being spaced from its adjacent end of the side plate a distance along the longitudinal center line of the side plate which is from .6 to .95 of the difference between the aforesaid width of the side plate and the diameter of the pitch hole.

7. An offset chain link side plate comprising a body portion having a pitch hole in one end portion to mount a bushing and a pitch hole in the other end portion to mount a chain pin, the end portion mounting the bushing being of greater width and less thickness on the transverse section passing through the pitch hole axis than the other end portion on a similar section, each of said pitch holes having a diameter which is from .45 to .6 of the width of the side plate on its aforesaid transverse section and being spaced from its adjacent end of the side plate a distance along the longitudinal center line of the side plate which is from .6 to .95 of the difference between the aforesaid width of the side plate and the diameter of the pitch hole.

HERBERT A. McANINCH.